A. DICKEY.
FRUIT-JAR.
No. 187,827. Patented Feb. 27, 1877.
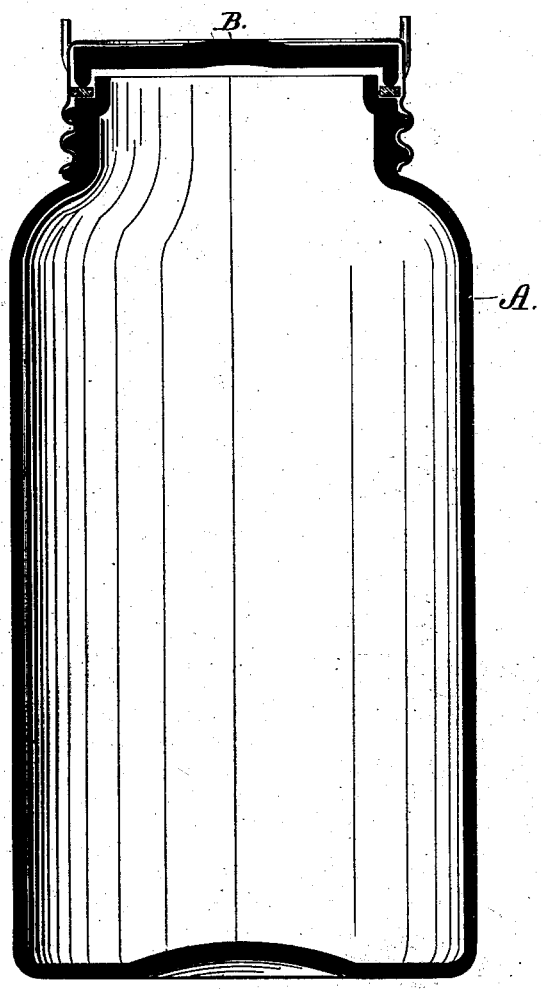
WITNESSES:
W. W. Hollingsworth
Edco. W. Byrn
INVENTOR:
Adam Dickey
BY
ATTORNEYS.

UNITED STATES PATENT OFFICE.

ADAM DICKEY, OF MIDDLETOWN, OHIO.

IMPROVEMENT IN FRUIT-JARS.

Specification forming part of Letters Patent No. 187,827, dated February 27, 1877; application filed October 25, 1876.

*To all whom it may concern:*

Be it known that I, ADAM DICKEY, of Middletown, in the county of Butler and State of Ohio, have invented a new and Improved Fruit-Jar; and I do hereby declare that the following is a full, clear, and exact description of the same, reference being had to the accompanying drawing, forming part of this specification, in which the figure is a vertical section of a jar made of black glass, in accordance with my invention.

The object of my invention is to provide a fruit-jar better adapted for preserving its contents, which jar, while possessing the non-corrosive qualities of glass, shall also possess the light-intercepting qualities of tin, and thus obviate the deleterious effects of light upon the fruit. To this end my invention consists, as a new article of manufacture, in a jar composed of black glass.

In the accompanying drawing, A represents a fruit-jar of any ordinary construction, provided with a cap, B, attached thereto in any suitable manner. This jar is made of glass of a black or any dark color, such as will exclude the light, the said coloring matter being mixed with the glass while under process of preparation, in the manner well known to glass-workers.

I propose to apply this color of glass to any style of jar, with either tin or glass tops; but I prefer to make the body and top of the jar of the same material, and fasten the top with wax.

A can or jar possessing all of the desirable qualities for preserving fruits and articles of food has always been a desideratum. Tin is extensively used for making cans for this purpose, by reason of some of its qualities; but it is objectionable on account of its tendency to corrode and become unfit for use, which corrosion takes place to such an extent, when the contents are characterized by acidity, as to impart to the same a disagreeable metallic taste, which is not only unpalatable, but unwholesome and injurious.

Transparent glass of the kind ordinarily used for fruit-jars is not open to this objection of corrosion; but, by reason of its transparency, light is transmitted to the fruit, and there produces objectionable chemical reaction, in that it causes the fruit to fade and lose its bright, fresh color, and also, to a great extent, induces fermentation.

Earthenware jars have also been used for putting up fruits, &c., and these, it is true, possess the qualities of opaqueness without the liability to corrosion; but the earthenware is either porous or glazed, and if porous, it permits the absorption of the fluids and involves difficulties in cleaning and eliminating the germs of ferment; and if glazed, the glazing becomes decomposed by the action of the acids, and produces discoloration of the fruit, and imparts to the latter a disagreeable flavor. Earthenware, moreover, is heavy and clumsy, and the various objections which apply to its use for fruit-jars have led to its abandonment for this purpose.

By making the jars of black or dark-colored glass, it will be seen that the color and flavor of the fruit are completely preserved, and while the jar possesses the quality of resisting the action of the acids, it is also free from the injurious effects of light, thus securing all the advantages of tin, earthenware, and glass, as heretofore used, with none of their disadvantages.

Having thus described my invention, what I claim as new is—

As a new article of manufacture, a fruit-jar composed of black glass, as and for the purpose specified.

ADAM DICKEY.

Witnesses:
 JAS. H. JACOBY,
 VERMONT HATFIELD.